Dec. 4, 1962 W. R. PRICE 3,066,952
TRACTOR IMPLEMENT MOUNTING LINKAGES
Filed May 4, 1960 2 Sheets-Sheet 1

W. R. PRICE
INVENTOR.
BY
P. F. HILDER
ATTORNEY.

Dec. 4, 1962 W. R. PRICE 3,066,952
TRACTOR IMPLEMENT MOUNTING LINKAGES
Filed May 4, 1960 2 Sheets-Sheet 2

W. R. PRICE
INVENTOR.
BY P. F. HILDER
ATTORNEY.

3,066,952
TRACTOR IMPLEMENT MOUNTING LINKAGES
William Richards Price, Gidea Park, Romford, England, assignor to Ford Motor Company, Dearborn, Mich.
Filed May 4, 1960, Ser. No. 26,824
Claims priority, application Great Britain May 6, 1959
3 Claims. (Cl. 280—415)

This invention relates to the three point mounted linkage used by tractors for the attachment and carrying of implements.

More particularly it refers to what is known as dual category linkage.

In this type of linkage it is usual to have two categories of sizes to match different tractors. It is, however, at times desirable to use an implement of one category on a tractor of a different category. In some cases, therefore, tractor manufacturers have provided means of converting the linkage existing on their tractor to accept implements of the other category.

With all of these known methods, however, there are two drawbacks relative to the lower link, i.e. it is necessary either to detach the whole link and reverse it and in so doing use spacing bushes at the tractor end, or detach the implement end of the lower links and replace it by an end designed to meet the other category and further, due to the different implement cross shaft lengths, it is necessary to transfer the check chain clevis from one hole to another to adjust to the new dimension.

An object therefore of this invention is to provide a means for converting the lower linkage from one category to another without having to detach the link or link members, preferably without having to adjust the check chains to the new category.

The invention consists of a tractor lower linkage in which a rotatable element is pivoted at the ends of each of the lower links, one end of which element carries a ball end of one category while the other carries a ball end of another category.

Means are provided for retaining this element in each operating position by inserting a linch pin through the ball end not in use and the lower link.

The lateral position and dimensions of these ball ends are so arranged that each category assumes its correct width between the ends of the lower links when in its operating position so that it is not necessary to adjust the check chains to accommodate the new setting.

The invention will be described with reference to the accompanying drawings wherein.

Figure 1:
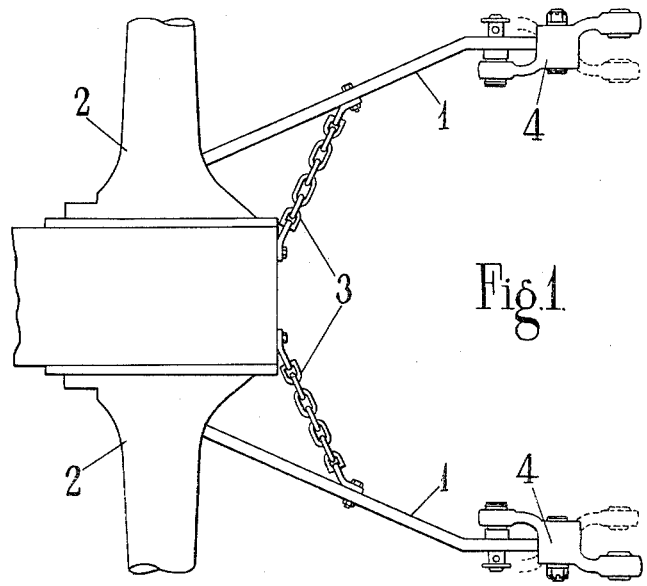
FIGURE 1 is a plan view of the lower links of the tractor.
Figure 2:
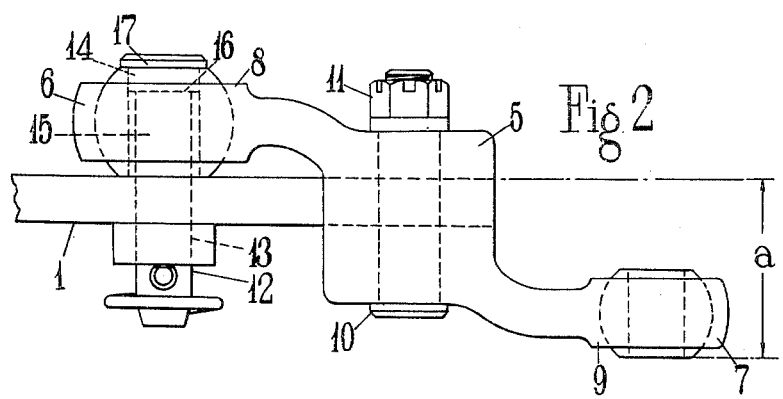
FIGURE 2 is a plan view of the end of the lower link showing the smaller category ball end in position ready for use.
Figure 3:
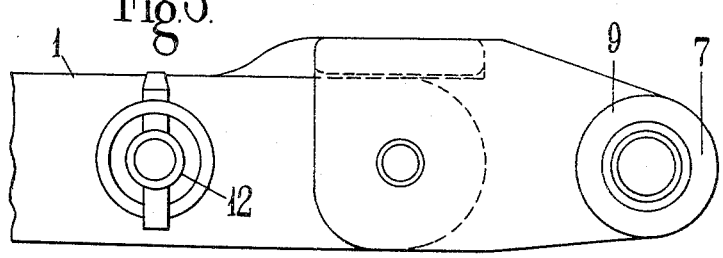
FIGURE 3 is a side elevation of FIGURE 2.
Figure 4:
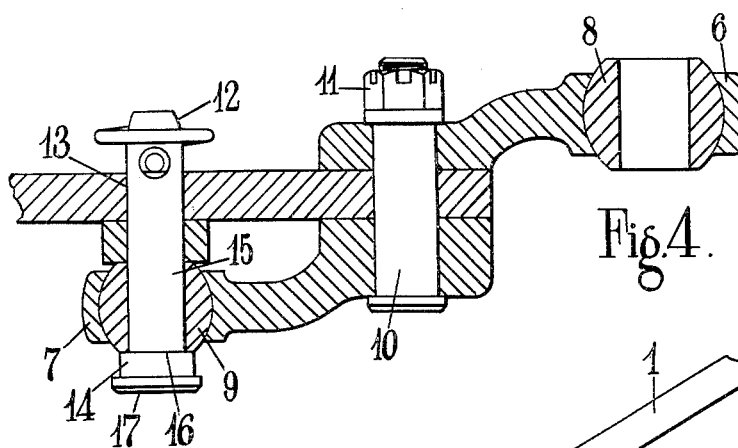
FIGURE 4 is a cross-sectional plan view similar to FIGURE 2 but showing the other category ball end in position.
Figure 5:
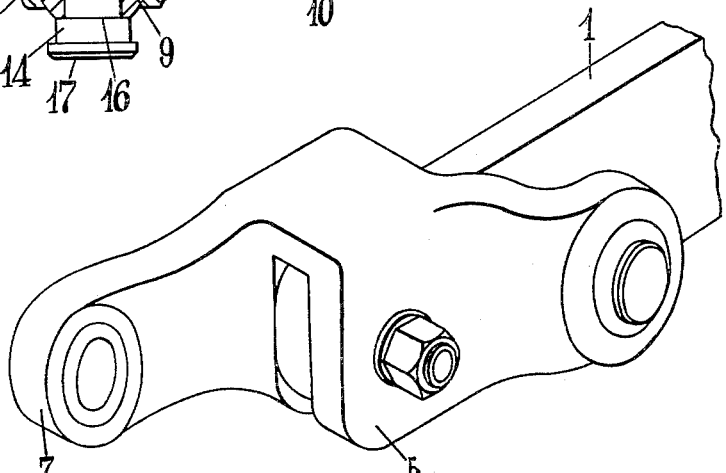
FIGURE 5 is a isometric view of FIGURE 2.

Referring now to FIGURE 1, this illustrates the lower link ends positioned to receive the larger category implements. The lower links 1 are pivoted at the tractor axle housings 2 so that they can move in a vertical arc but are restrained from moving in a lateral direction by the check chains 3. Attached to the ends of the lower links 1 are ball elements 4 which allow dual category linkage to be obtained.

Referring now to FIGURES 2, 3, 4 and 5 each ball end element is made of a suitable U-shaped forging with end pieces 6 and 7 extending in opposite directions. One of these carries the ball belonging to the large category 8 and the other the small category ball 9. This assembly is pivoted to the end of the lower links 1 by a pin 10 and clamped up by nut 11 allowing the ball assembly freedom to rotate. This construction is so arranged that the dimension "a" is half the difference between the two categories so that in reversing the ball end, dimensional compensation is made at once for the new category.

The assembly is locked in position by a linch pin 12 which engages with a hole 13 in the lower link. The linch pin 12 is stepped so that when engaging with the larger category ball 8 as in FIGURE 2, the larger diameter 14 engages in the ball while with the smaller category ball, the diameter 15 makes the engagement.

The distance of step 16 from the head of the pin 17 is so arranged that the difference between the widths of the two categories of balls is fully compensated. This could, of course, be achieved equally as well with a shouldered bolt and nut.

It is to be understood that the method of construction illustrated in the patent could be suitably altered to achieve the same ends.

I claim:

1. A tractor lower draft link assembly, comprising a rearwardly extending draft link, an element having a ball mounted for universal movement in each end thereof, the balls having bores of different sizes for different categories of linkage, a pivot mounting the midportion of the element on the rear end of the draft link for vertical swinging movement of the element to rotate either ball-carrying end into operative position generally in rearward extension of the draft link, the axes of the bores being equidistant from the pivot and the balls being offset laterally from the draft link so as to be rotatable into a position beside the draft link, the draft link having a hole adjacent its rear end and spaced from the pivot a distance equal to the spacing of the bores from the pivot, and a removable pin extending through the hole in the draft link and the ball at the forward end of the element for locking the element in position, the pin having a diameter throughout most of its length corresponding to the smaller diameter bore and a portion adjacent one end thereof corresponding to the larger diameter bore.

2. A tractor lower draft link assembly as claimed in claim 1, in which the two ball-carrying ends of the element are offset on opposite sides of the rear end of the draft link.

3. A tractor lower draft link assembly as claimed in claim 2, in which the two ball-carrying ends of the element which lie on opposite sides of the lower draft link are joined by a web portion adjacent the pivot.

References Cited in the file of this patent

UNITED STATES PATENTS

| | | |
|---|---|---|
| 2,692,148 | Bywater | Oct. 19, 1954 |
| 2,827,307 | Osborn | Mar. 18, 1958 |
| 2,872,213 | Hosford | Feb. 3, 1959 |
| 2,911,233 | Riddle | Nov. 3, 1959 |
| 2,968,494 | Klouda | Jan. 17, 1961 |

FOREIGN PATENTS

| | | |
|---|---|---|
| 209,178 | Austraila | June 26, 1957 |
| 463,395 | Germany | July 27, 1928 |
| 763,778 | Great Britain | Dec. 19, 1956 |
| 804,954 | Great Britain | Nov. 26, 1958 |